United States Patent [19]

Hernandez et al.

[11] Patent Number: 4,470,032
[45] Date of Patent: Sep. 4, 1984

[54] MAGNETIC CHUCK

[76] Inventors: Walter Hernandez, 6925 W. 3rd Ct., Hialeah, Fla. 33014; Luis E. Saumell, 6318 SW. 23 St., Miami, Fla. 33155

[21] Appl. No.: 439,918

[22] Filed: Feb. 25, 1983

[51] Int. Cl.³ .............................................. H01F 7/20
[52] U.S. Cl. ..................................... 335/288; 335/295
[58] Field of Search ................ 335/285, 286, 287, 288, 335/295

[56] References Cited

U.S. PATENT DOCUMENTS 3,089,066  5/1963  Uc et al. ............................... 335/295
4,251,791  2/1981  Yanagisawa et al. ........... 335/295 X Primary Examiner—George Harris
Attorney, Agent, or Firm—John Cyril Malloy

[57] ABSTRACT

A magnetic chuck for use in grinding optical lenses consisting of a means for increasing or decreasing the magnetic force exerted by a magnetic attachment surface contained in a housing sized for use in a lens grinding machine, wherein the means for increasing or decreasing the magnetic force exerted by the magnetic attachment surface is operated by means of manually operating a control to rotate a permanent magnet 90 degrees from a first position to a second position, where in the first position the magnetic force exerted by the magnetic attachment surface is minimal and in the second position, a substantial increase of magnetic force is exerted by the magnetic attachment surface for secured attachment of the lens piece during grinding of a raw glass lens blank into an optical lens.

1 Claim, 9 Drawing Figures

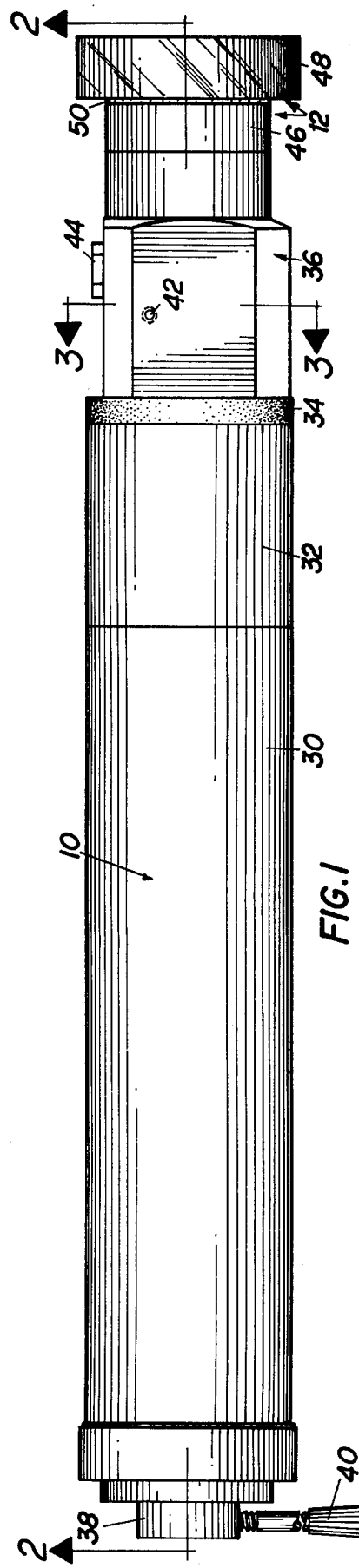
FIG.1
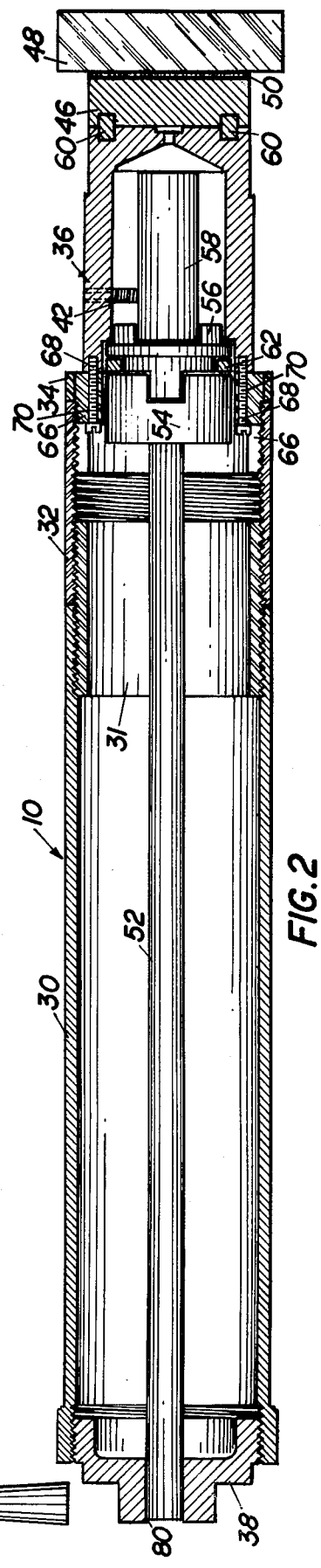
FIG.2
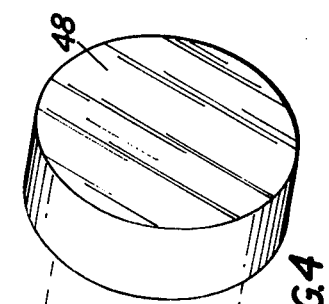
FIG.3
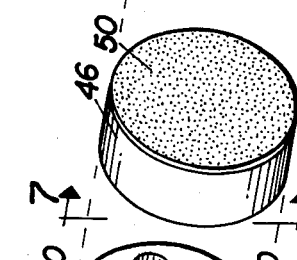
FIG.4
FIG.5
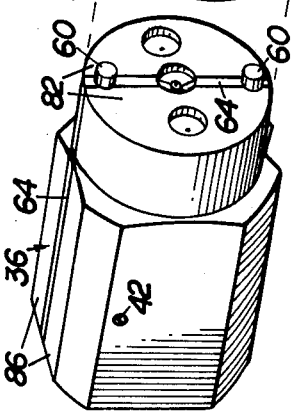
FIG.6
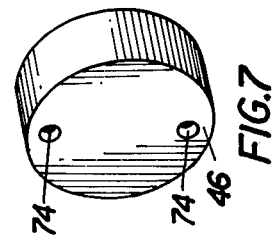
FIG.7

MAGNETIC CHUCK

FIELD OF THE INVENTION

The present invention pertains to optical lens grinder devices and more particularly to a magnetic chuck for use in a lens grinding machine for ease and quickness of attaching and detaching raw glass pieces to be ground into lenses which will greatly increase the number of lenses that can be ground in a certain amount of time.

BACKGROUND OF THE INVENTION

Currently, raw glass lens blanks to be ground into optical lenses are attached to an optical lens grinder by means of brackets or straps or some other means which is much more time-consuming than the method disclosed in the present invention. The present invention accomplishes a quick and easy attachment and release of lens pieces through a magnet means of attaching such raw glass lens pieces. By providing a quicker means for the attachment and release of lens pieces, more optical lenses can be ground in a period of time increasing the capacity and efficiency of the lens grinding machine and correspondingly reducing significantly the wholesale and retail cost of optical lenses.

OBJECTS OF THE PRESENT INVENTION

One of the principal objects of the present invention is to provide a quick and easy attachment and detachment means through a simple increase or decrease in a magnetic force placed on an attachment surface on which a raw glass lens blank in fixed combination with a magetizable magnetic disc can be attached and detached.

A further principal object of the invention is to increase the number of optical lenses that can be ground in a certain amount of time, thus increasing the capacity and efficiency of the lens grinding machine and correspondingly reducing significantly the wholesale and retail cost of optical lenses.

Another important object of this invention is to provide a means for attachment and detachment of the raw glass disc so that the average operator of a lens grinding machine can easily increase or decrease the magnetic force exerted on the magnetic attachment surface requiring a minimum amount of skill to operate said machine and reduce the amount of training involved in preparing someone to operate the lens grinding machine.

In accordance with these and other objects which will become apparent hereinafter, the instant invention will now be described with reference to the accompanying drawings in which:

DESCRIPTION OF THE DRAWINGS

FIG. 1 is a side elevation view of the magnetic chuck with the lens piece attached;

FIG. 2 is a cross section view of FIG. 1 taken at the section lines indicated in FIG. 1;

FIG. 3 is a section view of FIG. 1, taken at the section lines indicated in FIG. 1, showing the 90° rotation of the permanent magnet;

FIG. 4 is a perspective view of the raw glass disc of the lens piece in assembly;

FIG. 5 is a perspective view of the magnetizable metal disc of the lens piece in assembly depicting the surface of metal disc covered with bonding material to be used in attaching the raw glass lens blank;

FIG. 6 is a perspective view of section five of the housing and magnetized attachment surface in assembly;

FIG. 7 is a perspective view of the magnetizable metal disc of the lens piece shown from the angle as indicated by the section lines of FIG. 5 and depicting the two orienting recesses in the surface opposite that of the surface shown in FIG. 5;

DETAILED DESCRIPTION OF THE PREFERRED EMBODIMENT

Figures 8, 8A:
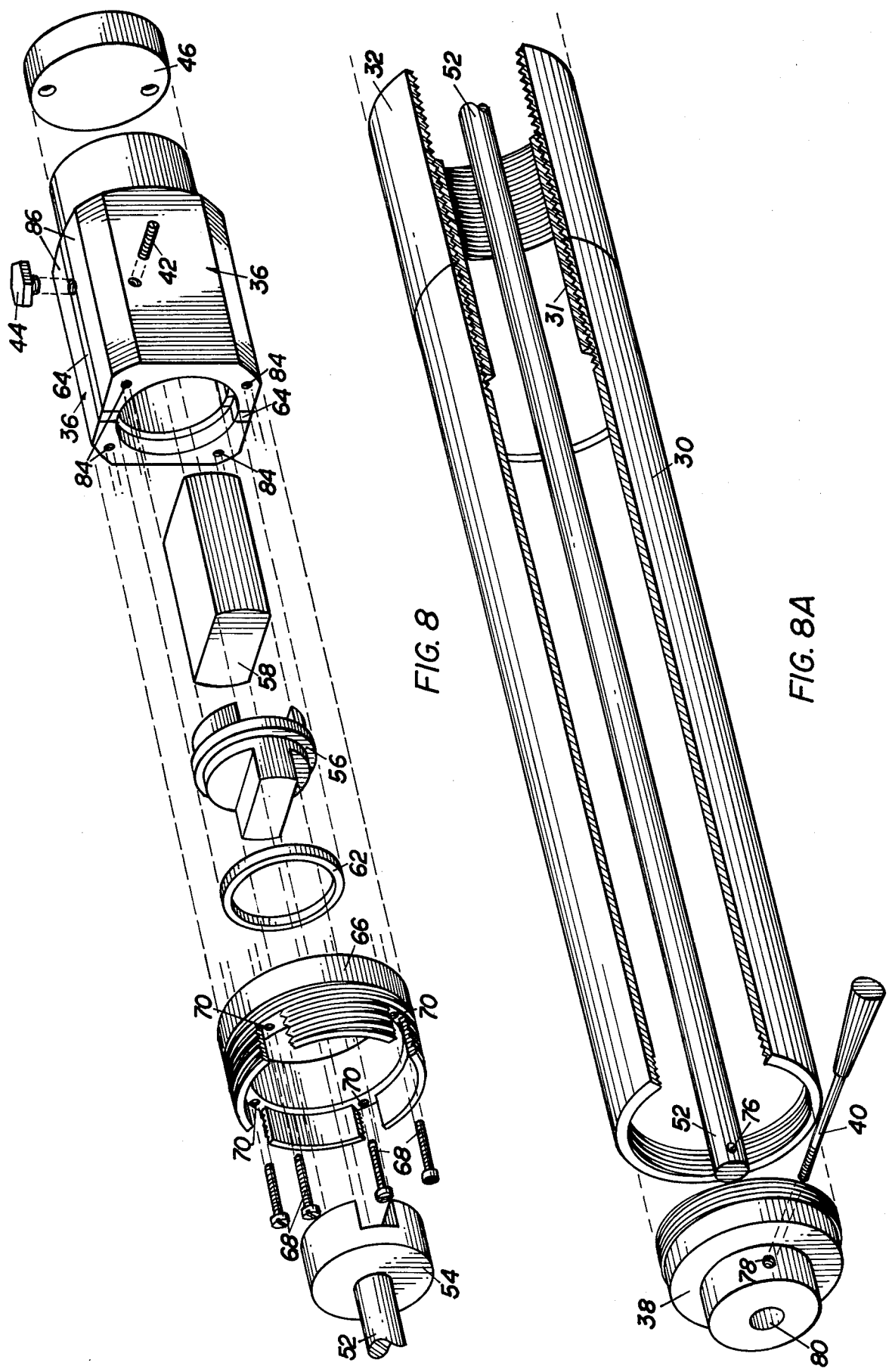
FIG. 8 shows an exploded assembly view of the fourth and fifth sections of the housing and the components included therein.
FIG. 8A is a continuation of FIG. 8 showing the assembly of the magnetic chuck continuing to the left of FIG. 8, including the first, second and third sections of the housing and the components included therein.

With reference to the drawings in which like reference characters designate like or corresponding parts throughout the various views and with particular reference to FIG. 1, 8 and 8A, the magnetic chuck of the present invention designated generally at 10 includes a cylindrical housing consisting of five sections, 30, 31, 32, 66 and 36. The first four sections 30, 31, 32 and 66 are assembled to define a homogeneous smooth cylindrical surface.

The first section of the cylindrical housing 30 has two internally threaded ends, one for threaded engagement with the cap 38 and the other for threaded engagement with the second section of the housing 31 as best illustrated in FIG. 2 and FIG. 8A. Also as seen in FIG. 2 and FIG. 8A, section two of the cylindrical housing 31 is in threaded engagement with both the first section of the cylindrical housing 30 and the third section of the cylindrical housing 32. The fourth section of the cylindrical housing 34 is also seen in FIG. 2 to be in threaded engagement with the third section of the cylindrical housing 32. Sections 31, 32 and 34 are made of a non-magnetizable rigid material, preferably brass. Still referring to FIGS. 2 and 8A, section four, 66, includes four equally spaced threaded through holes 70. Each threaded through hole 70 is in threaded engagement with a non-magnetizable bolt 68, preferably made of brass. Section four includes a plastic exposed portion 34 sized to be flush with the smooth homogeneous cylindrical surface defined by the first three sections, 30, 31, 32.

Section five, 36, also described as the permanent magnet housing, is made of a non-magnetizable material, preferably brass, and includes four threaded recesses 84, with each recess being sized for threaded engagement with a non-magnetizable bolt 68 for attachment of section five, 36, to section four, 66. Section five, 36, includes two protruding orienting tips 60 for attachment of the lens piece 12.

As seen in FIG. 2 and FIG. 8A, a shaft 52 axially located in relation to the cylindrical housing 10 and made of a non-magnetizable material, preferably aluminum, has one end in mating relationship with the through hole 72 in the cap 38 and the other end consisting of a slotted disc 54 in conceptual relation with the magnetic holder 56. A permanent magnet 58 is held at one end by the magnet holder 56, with the other end resting against the conically shaped interior of section five of the housing 36. In operation, the control handle 40, FIG. 1, is turned 90 degrees which in turn, and at the same time, rotates the cap 38, the shaft 52, the slotted disc 54, the magnet holder 56 and the permanent magnet 58. After rotating 90 degrees from a first position to a second position, any further rotation of the above mentioned elements is prevented by the set screw 42 which comes in contact with the permanent magnet. The opposite rotation of the handle 90° produces the same resulting movement of the above elements from the second position to the first position and the prevention of further rotation by the set screw.

FIG. 3 shows a cross section view taken along the section lines indicated in FIG. 1 showing two magnetizable sections 86 separated by a non-magnetizable seam 64. In operation, when the magnet straddles the magnetizable halves 86 in the first position as shown, the magnetic force exerted by the attachment surface is significantly reduced as compared to when the magnet is rotated 90 degrees to a second position, as shown by the imaginary lines in FIG. 3, the force exerted by the magnetic attachment surface is greatly increased. Thus, in the first position the magnetic force exerted by the magnetic attachment surface 82 is relatively weak allowing for attachment and detachment of lens pieces. In the second position the lens piece is fixed to the magnetic chuck for grinding operations by the bond created by the magnetic attraction of the magnetizable surface 82 and the magnetizable metal disc 46. FIG. 3 also shows the operation of the set screw 42 in limiting the permanent magnet to a 90 degree rotation.

FIGS. 4, 5 and 6 show the attachment of the lens piece 12 to section five, 36, of the magnetic chuck. FIG. 4 shows a perspective view of the raw glass lens piece 48. FIG. 5 shows a perspective view of the magnetizable metal disc 46 and a bonding means 50, preferably glue, for bonding the raw glass lens piece 48 to the magnetizable metal disc 46. FIG. 6 shows section five of the housing 36 and the non-magnetizable seam 64, the magnetizable sections 86, the set screw 42 and the protruding orienting tips 60 which align and orientate the lens piece when attached to the magnetic chuck. FIG. 7 shows a view of the magnetizable metal disc taken on the section lines 7 of FIG. 5 and shows the orienting recesses 74 which are sized to receive the protruding orienting tips 60, FIG. 6.

As shown in the exploded assembly view of the magnetic chuck, FIGS. 8 and 8A and with particular reference to FIG. 8, the magnetizable metal disc 46 attaches to the permanent magnetic housing, or section five of the housing 36, which is comprised of two magnetizable metal halves 86, a non-magnetizable seam 64, set screw 42, a cap screw 44, four threaded recesses 84 for threaded engagement with the four non-magnetizable bolts 68. The permanent magnet 58 is housed in the permanent magnet housing 36 and is in mating relationship with the magnetic holder 56. The spacer ring 62 fits around one end of the magnet holder 56 creating a flush surface of corresponding diameter to the slotted disc 54 fixed to the shaft 52. Section four, 66, as shown in FIG. 8, includes four threaded through holes 70 for threaded engagement with the non-magnetizable bolts 68 and attachment to the permanent magnet housing 36. The externally threaded portion of section four is for threaded engagement with section three, 32, FIG. 8A.

As shown in FIG. 8A, section three of the housing 32 is in threaded engagement with section two of the housing 31 and section two is in threaded engagement with section one of the housing 30. The cap 38 is in threaded engagement with section one of the housing 30 and has a through hole 80 sized for mating relationship with the shaft 52. The control hand 40 is sized for threaded engagement with the set screw hole 78 and terminating in the shaft recess 76 fixing the cap 38 to the shaft 52.

What is claimed is:

1. A magnetic chuck for use in grinding optical lenses consisting of:
   (a) a housing sized for compatible use in a lens grinding machine,
   said housing exposing at one end a magnetic attachment surface for attachment of a lens piece,
   (b) a means for increasing or decreasing the magnetic force exerted by the magnetic attachment surface consisting of,
   a permanent magnet housing consisting of,
     two magnetizable halves separated and bonded to a non-magnetizable seam,
     said magnetizable half and seam define a cylindrical cavity of a diameter sized to snugly house a rotatable permanent magnet,
     said permanent magnet housing having a threaded set screw through hole,
     said permanent magnet housing having a side defining a magnetizable attachment surface with two orienting tips protruding perpendicularly from the plane of said surface for attachment of a lens piece,
   a permanent magnet having a first end, a second end, a set of oppositely facing curved sides, and a set of oppositey facing flat sides,
     said first end being snugly and magnetizably held by a magnet holder and said second end resting against a side wall of the permanent magnet housing,
     said set of oppositely facing curved sides defining a width substantially equal to but less than the diameter of the permanent magnet housing cavity and in curved relationship to said diameter,
     said set of oppositely facing flat sides defining a height less than that of the width of and approximately equal to one-half the width,
   a magnet holder having a first end and a second end,
     said first end having two oppositely facing half-moon shaped legs separated by a distance approximately equal to that of the heighth of the permanent magnet so that the half-moon shaped legs hold the permanent magnet securely in place,
     said second end being adapted for a means of manual rotation of the magnet holder and the magnet either clockwise or counterclockwise,
     said magnet holder being made of a magnetizable material so that there is a magnetic bond fixing the magnet holder to the permanent magnet,
   a means for manually rotating the magnet holder from outside the chuck housing,
   a set screw in threaded engagement with the threaded set screw hole in the permanent magnet housing and extending to protrude from the wall of the cylindrical cavity within the permanent magnet housing and defining a means for limiting the rotation of the magnet and defining a first position and a second position,
     said first position defined as the position where the curved sides of the permanent magnet are in contact with the seam, said second position of the magnet defined as the position where the magnet is rotated 90° from the first position and the curved sides are in full contact with each of the magnetizable halves of the permanent magnet housing, (c) a lens piece comprising a disc-shaped raw glass lens blank of predetermined diameter and thickness and a magnetizable metal disc of predetermined thickness and diameter, said raw glass blank disc and magnetizable metal disc being fixed together in axial symmetry by a bonding means such that they can be separated without damaging either the raw glass blank disc or the magnetizable metal disc, said magnetizable metal disc having two orienting recesses on opposite sides at equal distance from the axis of a lens piece, said recesses being sized to receive the two orienting tips extending perpendicularly from the magnetic attachment surface.

* * * * *